Dec. 8, 1936.  A. N. TAYLOR  2,063,207
FLUTED HEADLIGHT LENS
Filed Aug. 5, 1929  2 Sheets-Sheet 1
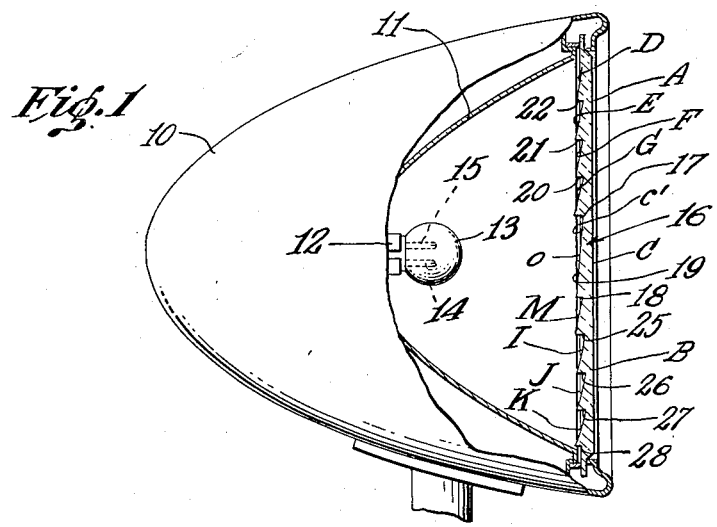
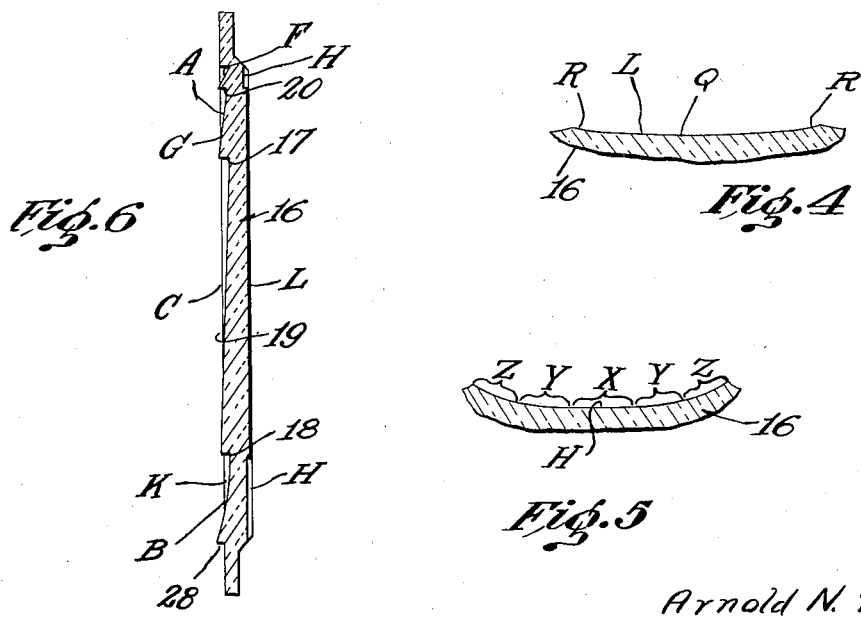
INVENTOR
Arnold N. Taylor
BY
ATTORNEYS Dec. 8, 1936.  A. N. TAYLOR  2,063,207
FLUTED HEADLIGHT LENS
Filed Aug. 5, 1929  2 Sheets-Sheet 2
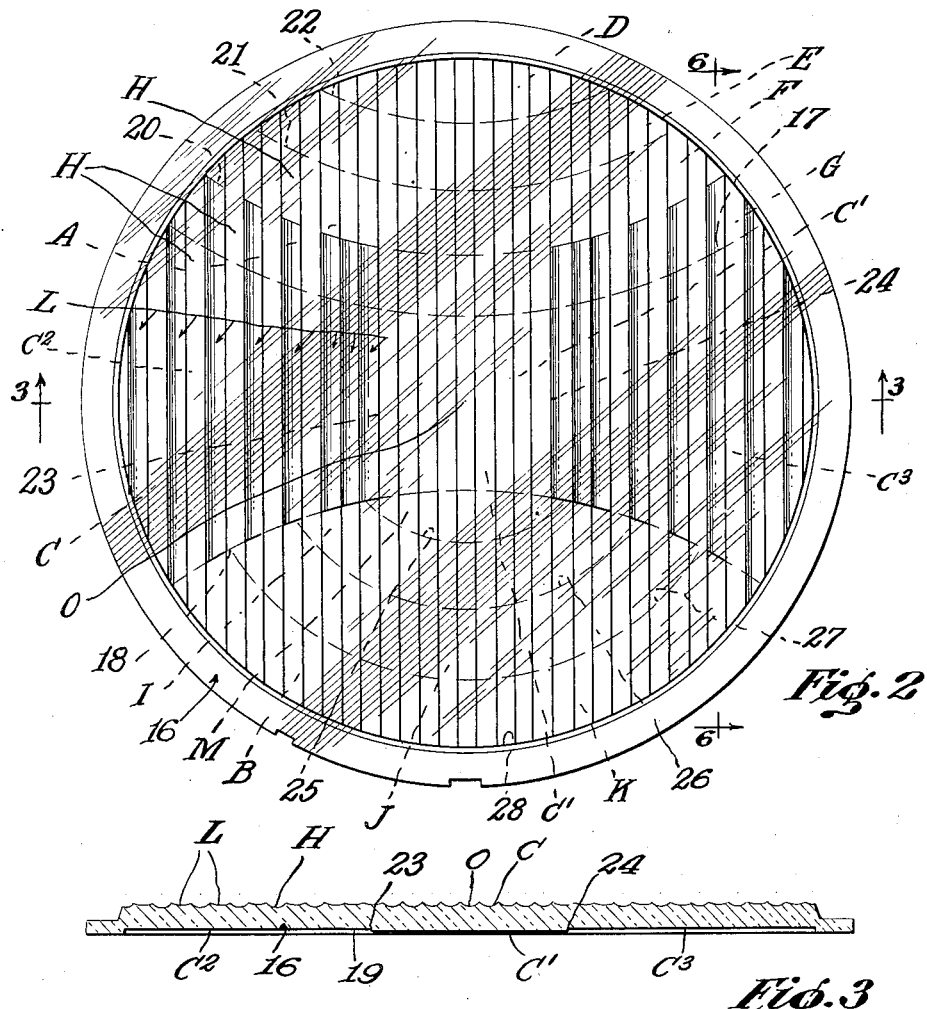
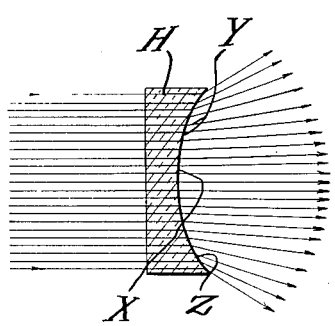
INVENTOR
Arnold N. Taylor
BY
ATTORNEYS Patented Dec. 8, 1936

2,063,207

UNITED STATES PATENT OFFICE 2,063,207

FLUTED HEADLIGHT LENS

Arnold N. Taylor, Detroit, Mich., assignor to C. M. Hall Lamp Company, Detroit, Mich., a corporation of Michigan Application August 5, 1929, Serial No. 383,556

14 Claims. (Cl. 240—41.4)

The invention relates to lenses for vehicle headlights and more particularly to the construction of fluting for the lens.

The underlying object of the invention is to obtain a vehicle headlight lens so constructed as to provide ideal illumination ahead of the vehicle without producing any glare.

More specifically the invention has for its object the provision of means for laterally deflecting or diffusing the light emitted from the lamp in order to produce an even pattern with the light of greatest intensity at the point where it is most needed.

A further object is to provide a certain construction of vertical fluting on the lens so designed as to eliminate bright spots such as are often produced by other fluted lenses not constructed in accordance with this invention.

These and other objects are attained by providing the novel lens construction hereinafter more fully described and illustrated in the drawings, wherein Figure 1 is a side elevation of a lamp provided with the improved lens;

Figure 2 is a front view of the lens;

Figure 3 is a horizontal section on the line 3—3 of Figure 2;

Figure 4 is an enlarged sectional view of a so-called L flute.

Figure 5 is a similar view of a so-called H flute.

Figure 6 is a vertical section on the line 6—6 of Figure 2.

Figure 7 is a diagrammatic view illustrating the distribution of light from a flute of the type illustrated in Figure 5.

My invention deals with the construction of the fluting used in automobile headlight lenses. While it is well known that the provision of vertical flutes in the headlight lens is useful in laterally dispersing the light so as to obtain a broader band of illumination, I have discovered that the illumination from a headlamp may be improved by constructing the vertical flutes in a novel manner. Thus, as shown on an enlarged scale in Figure 5 the flute designated by the letter H has a central portion X of very slight curvature, intermediate portions Y on each side of the central portion of slightly greater curvature and outer portions Z of substantially greater curvature. In other words, the flute illustrated in Figure 5 has a continuous curvature throughout its cross section but this curvature is very slight in the central portion and progressively increases from the central portion to the extreme ends. The curve shown in Figure 5 while not an exact mathematical ellipse is, nevertheless, of such a character as to correspond substantially to a section of an elliptical curve, the portion X representing a side of the ellipse parallel to the major axis thereof.

The object of the construction as set forth is to provide a certain distribution of rays which will produce the best lighting conditions. Figure 7 shows diagrammatically on an exaggerated scale the distribution of light from a flute of the type illustrated in Figure 5. It will be noted that the rays passing through the central portion of the flute are fairly concentrated. Those passing from the intermediate portions Y are deflected slightly outward, whereas the rays from the extreme ends corresponding to the portions Z of the flute immerge at a substantial angle.

Another advantage of the construction illustrated in Figure 5 is that in the commercial manufacture of lenses, which is ordinarily carried out by the molding of glass in a suitable mold, there is a tendency for the glass at the edges of the curved flutes to flatten out instead of conforming exactly to the curvature of the mold. These flat spots tend to concentrate the light emitted therefrom with the formation of bright spots at the extreme ends of the light pattern thrown by the lamp. With the flute of the contour illustrated in Figure 5 the increased curvature at the outer edges of the flute tends to cause a greater spreading of the light rays and thus counteracts the concentration tendency of the molded glass.

From the above, it will be noted that my invention consists essentially in providing a headlight lens with vertical flutes so constructed as to eliminate bright spots at the extreme ends of the beam and to provide a light pattern having gradual changes of intensity from one zone to another.

Another feature of my invention is the arrangement of the vertical flutes so as to provide both the concentration of light at the desired points and the lateral spreading of the light to provide a broad band of illumination. In accordance with my invention this is accomplished by utilizing two or more different types of flutes. One of the types illustrated in Figure 5 and denoted by the letter H and the other illustrated in Figure 4 and denoted by the letter L. The flute illustrated in Figure 4 has much less curvature than that illustrated in Figure 5 but is constructed somewhat along the same principle having its outer ends of greater curvature than the central portion, thus the central portion Q is of very slight curvature while the outer portions R are of greater curvature.

In constructing a specific lens in accordance with my invention, some of the flutes are given a configuration like that shown in Figure 5 and others of that shown in Figure 4. In the particular example illustrated in Figure 2 all of the flutes have the relatively greater curvature shown in Figure 5 with exception of those illustrated by the shading and designated on the drawing by the reference letter L.

While the novel form of fluting may be used on many different types of lenses, it is particularly adapted for use with the specific lens illustrated in the drawings, which construction will hereinafter be more fully described. Thus referring to the drawings, the numeral 10 represents a headlamp provided with a reflector 11 and having a socket 12 for reception of a lamp bulb 13. As shown, the lamp bulb is of the type having a double filament, the lower filament 14 being substantially at the focal point of the reflector for imparting rays adapted for distant illumination and the upper filament 15 being arranged for close illumination. 16 represents the lens secured to the lamp 10 in any suitable manner to maintain the same in fixed relation with respect to the reflector.

My improved lens is divided into three main zones, the upper and lower zones A and B respectively, and the central zone C. The central zone C is separated from the two outer zones by boundary lines 17 and 18, which in the preferred form are arcs of circles. The surface of the central zone C is a flat or plane surface 19, which may in some instances be parallel to the plane of the lens, but in the preferred form is inclined at a slight angle thereto to cause a slight downward refraction of the light rays passing therethrough. In the construction illustrated, the zone C is sub-divided into a mid zone C' extending from the vertical lines 23 and 24, which zone C' has a greater angle of refraction than the end zones C² and C³. The angle of these latter zones is shown in Figure 6 and in the particular construction illustrated the angle of refraction is 1° whereas the angle of refraction of the mid zone C' is 2° as illustrated in Figure 3.

The upper main zone A is sub-divided into a series of sub-zones D, E, F, and G respectively which in the preferred form are bounded by arcs of circles 17, 20, 21, and 22, all of which are preferably struck from a common center lying outside of the lens proper. The sub-zones D, E, F, and G are not plane surfaces similar to the central zone C but are surfaces of revolution and preferably sections of the surfaces of a series of coaxial cones. The centers of the several cones are arranged at spaced points along the common axis of the cones to provide the stepped arrangement illustrated in Figure 1. It is also preferable to have the sub-zones E, F, and G of progressively diminishing angle from the top of the lens toward the central zone C. Thus as specifically shown, the angle of zone D is 8°, zone E 8°, zone F 7° and zone G 4°.

The zone B is also sub-divided into a series of sub-zones M, I, J, and K. These sub-zones are also formed as surfaces of revolution but in the particular case illustrated they are modified from true sections of the surface of a cone by providing a varying angle of inclination from one boundary to the opposite boundary. The sub-zones are preferably bounded by arcs of circles 25, 26, 27, and 28, all of which are struck from a common center, and in the specific design shown this center is coincident with the center O of the lens. The angle of refraction of the successive zones from M in a radial outward direction to the sub-zone K is gradually increased so that the sub-zone I has an average angle greater than sub-zone M and sub-zone J has an average angle greater than sub-zone I and sub-zone K has an average angle greater than the sub-zone J. These angles, however, are not constant for each sub-zone as is the case with the upper sub-zones D, E, F, and G respectively, but some of the lower sub-zones are provided with a sweep or a changing angle from one boundary to the other. In other words, the surfaces of the sub-zones I, J, and K are curved in two directions, that is, they are curved in the direction of the boundaries and also curved in a radial direction between the boundaries.

In the specific construction illustrated, the zone M is a section of a cone having an angle of 3° and is provided with no sweep. The sub-zone I has an angle gradually changing from 5° at the boundary 25 to 9° at the boundary 26. The sub-zone J has a sweep or angle varying from 6° to 10° and the sub-zone K is inclined from 7° to 11°.

The advantage of the changing angle in the lower sub-zones is that the light pattern from each of the sub-zones is increased in depth and therefore the patterns from adjacent sub-zones, for example, from zones I and J, have a greater overlap. This is particularly advantageous when the lamp filament is slightly out of focus, as in such instances there is a tendency toward bad illumination unless the various refracting zones are so designed as to provide sufficient overlap to eliminate dark spots in the projected light.

It will be noted that the various zones so far described have all been formed in the glass upon one side of the lens, whereas the vertical flutes have been formed on the opposite side of the glass.

It will also be observed that the flutes H having the greater curvature extend for the entire length of the lens in the central portion of the lens and that the ends of the vertical flutes are all of the same curvature except in the so-called central zone C. In this central zone it will be observed that the L flutes extend from the boundary line 18 to the boundary line 20. These L flutes are provided for the purpose of obtaining a bright spot of high intensity in the center of the beam, the L flutes being of less curvature cause the light rays to be emitted therefrom in a more concentrated form, thus forming the spot of high intensity at the center of the beam. As indicated in Figures 2 and 3 the H flutes are used in the central mid-zone C' of the lens, but the L flutes are interposed singly between the H flutes in the two end zones C² and C³. In the particular example illustrated there are certain L flutes arranged as a group of three and interposed between the central mid-zone C' and each of the outer end zones C² and C³. It is also to be noted that the H flutes are used throughout the entire lower zone B and throughout most of the area in the upper zone A.

While my invention is not to be limited to the exact size of the flute used or to the exact width thereof, it is nevertheless the preferred construction to employ a series of vertical flutes of substantially equal width. In the type of lens illustrated in the drawings, the preferred width of the flute is approximately one-quarter of an inch and both the H flutes and the L flutes are of substantially equal width.

What I claim as my invention is:

1. A headlight lens having on one side refracting zones for deflecting the light downwardly, said refracting zones comprising a central main zone bounded by oppositely curved transverse arcs and an upper zone and a lower zone on opposite sides of said main zone, said upper and lower main zones being subdivided into a series of sub-zones, all of the zones aforesaid being inclined in the same direction and said zones progressively decreasing in inclination from the outer zones toward the center zone, said lens having on the opposite side thereof a series of transversely arranged flutes for spreading the light laterally, said flutes being of substantially the same width over the entire lens, some of said flutes being of less curvature than the others and being interposed singly between flutes of greater curvature.

2. A lens for the purpose described having on one face flutes extending to the top and bottom margins of the light transmitting portion which decrease in curvature from the vertical axis towards the lateral margins and having on the opposite face parallel prisms all sloped in one direction and which progressively decrease in slope from the vertical margins towards the horizontal axis.

3. A headlight lens having a series of refracting zones for deflecting the light downwardly, said zones progressively decreasing in inclination from the outer zones toward the center zone and all being inclined in the same direction, said lens having a series of transverse flutes for spreading the light laterally, said flutes being of substantial curvature in the upper, lower and mid-central portions of said lens and a series of flutes of slight curvature in the side portions of said lens.

4. A headlight lens having a series of refracting zones for deflecting the light downwardly, said zones progressively decreasing in inclination from the outer zones toward the central zone and all being inclined in the same direction, said lens having a series of transverse flutes for spreading the light laterally, said flutes being of substantial curvature in the upper, lower and mid-central portions of said lens and a series of flutes of slight curvature and a series of flutes of said substantial curvature both arranged alternately in the side-central portions of said lens.

5. A headlight lens having a series of refracting zones for deflecting the light downwardly, said zones including an upper zone, a central zone and a lower zone, a series of flutes for spreading the light laterally, said flutes being of substantial curvature in said upper and lower zones and in the mid-portion of said central zone, and flutes of slight curvature interposed singly between flutes of said substantial curvature in the side portions of said central zone.

6. A headlight lens having a series of refracting zones for deflecting the light downwardly, said zones comprising a central main zone bounded by oppositely curved transverse arcs and an upper zone and a lower zone on opposite sides of said central main zone, said upper and lower zones being sub-divided into a series of sub-zones, all of the zones aforesaid being inclined in the same direction and said sub-zones progressively decreasing in inclination from the outer zones toward the central zone, said lens having a series of transversely arranged flutes for spreading the light laterally, said flutes being of substantial curvature in the upper and lower zones and in the mid-portion of said central zone, said flutes being alternately of substantial curvature and of slight curvature in the side portions of said central zone.

7. A headlight lens having on one side thereof a plurality of transversely extending refracting zones to deflect the light downwardly, said refracting zones comprising a central main zone bounded by oppositely curved transverse arcs, an upper zone and a lower zone on opposite sides of said main zone, said upper zone being sub-divided into a series of sub-zones of substantial width, each bounded by substantially concentric arcs, said lower zone being sub-divided into a series of sub-zones bounded by a series of concentric arcs, both of said upper and lower zones having the respective sub-zones inclined in the same direction and increasing in angle of inclination from the center of the lens toward the outer periphery thereof and a series of parallel flutes on the opposite side of said lens for spreading the light laterally.

8. A headlight lens having on one side thereof a plurality of transversely extending refracting zones for deflecting the light downwardly, said refracting zones comprising a central main zone bounded by oppositely curved transverse arcs, an upper zone and a lower zone on opposite sides of said main zone, said central main zone having two outer end portions and a mid-portion intermediate said outer end portions of greater angle of inclination than said end portions, said upper zone being sub-divided into a series of sub-zones of substantial width, each bounded by substantially concentric arcs, said lower zone being sub-divided into a series of sub-zones bounded by a series of concentric arcs, said sub-zones in said upper and lower zones having the average angle of inclination increasing from the center of the lens toward the outer periphery thereof and being inclined in the same direction, said lens having on the opposite side thereof a series of parallel flutes of substantially equal width throughout the entire lens, some of the flutes in said outer end portions of said central main zone having less curvature to obtain a more concentrated beam.

9. A headlight lens having on one side thereof a plurality of transversely extending refracting zones for deflecting the light downwardly, said refracting zones comprising a central main zone bounded by oppositely curved transverse arcs, an upper zone and a lower zone on opposite sides of said main zone, said central main zone having two outer end portions and a mid-portion intermediate said outer end portions of greater angle of inclination than said end portions, said upper zone being sub-divided into a series of sub-zones of substantial width, each bounded by substantially concentric arcs, said lower zone being sub-divided into a series of sub-zones bounded by a series of concentric arcs, said sub-zones in said upper and lower zones having the average angle of inclination increasing from the center of the lens toward the outer periphery thereof and being inclined in the same direction, said lens having on the opposite side thereof a series of parallel flutes of substantially equal width throughout the entire lens, said flutes being of substantial curvature in said upper and lower zones and in said mid-portion of said central main zone and some of the flutes in said outer end portions of said central main zone being of slight curvature and interposed at spaced intervals between said flutes of substantial curvature.

10. A headlight lens having a plurality of vertical flutes arranged on one side thereof and a plurality of refracting zones on the opposite side thereof, said refracting zones comprising a central main zone bounded by oppositely curved arcs, said central main zone having its mid-portion formed as a flat surface having a relatively small angle of inclination and said central main zone having the end portions on each side of said mid-portion formed as flat surfaces inclined at a smaller angle than said mid-portion, the upper portion of the lens above the central portion being sub-divided into a series of surfaces of revolution having progressively increasing angle of inclination from said central zone toward the outer periphery of the lens, and the portion of the lens below said central section being sub-divided into a series of sub-zones of increasing average angle from the central zone toward the outer periphery, the sub-zones last mentioned being curved in a radial direction to increase the depth of the light pattern projected therefrom.

11. A headlight lens having a plurality of parallel flutes arranged on one side thereof to spread the light laterally and a plurality of transversely extending refracting zones on the opposite side thereof to deflect the light downwardly, said refracting zones comprising a central main zone bounded by oppositely curved transverse arcs and an upper zone and a lower zone on opposite sides of said main zone, said central main zone having two outer end portions and a mid-portion intermediate said outer end portions of greater angle of inclination than said end portions, said upper zone being sub-divided into a series of sub-zones of substantial width, each bounded by substantially concentric arcs, and the lower zone being sub-divided into a series of sub-zones bounded by a series of concentric arcs curving in the same direction as the arcs of said first mentioned sub-zones, said upper and lower sub-zones having the average angle of inclination increasing from the center of the lens toward the outer periphery thereof and the sub-zones in said lower zone having a curved contour in a radial section through said lens.

12. A headlight lens having a plurality of parallel flutes arranged on one side thereof to spread the light laterally and a plurality of transversely extending refracting zones on the opposite side thereof to deflect the light downwardly, said refracting zones comprising a central main zone bounded by oppositely curved transverse arcs and an upper zone and a lower zone on opposite sides of said main zone, said central main zone having two outer end portions and a mid-portion intermediate said outer end portions of greater angle of inclination than said end portions, said upper zone being sub-divided into a series of sub-zones of substantial width, each bounded by substantially concentric arcs, and the lower zone being sub-divided into a series of sub-zones bounded by a series of arcs concentric with the center of said lens and curving in the same direction as the arcs of said first mentioned sub-zones, said upper and lower sub-zones having the average angle of inclination increasing from the center of the lens toward the outer periphery thereof and the sub-zones in said lower zone having a curved contour in a radial section through said lens.

13. A headlamp comprising a reflector, a double filament incandescent lamp having one filament above the focal point of said reflector and a lens having a plurality of parallel flutes arranged on one side thereof to spread the light laterally and a plurality of transversely extending refracting zones on the opposite side thereof to deflect the light downwardly, said refracting zones comprising a central main zone bounded by oppositely curved transverse arcs and an upper zone and a lower zone on opposite sides of said main zone, said central main zone having two outer end portions and a mid-portion intermediate said outer end portions of greater angle of inclination than said end portions, said upper zone being sub-divided into a series of sub-zones of substantial width, each bounded by substantially concentric arcs, and the lower zone being sub-divided into a series of sub-zones bounded by a series of arcs concentric with the center of said lens and curving in the same direction as the arcs of said first mentioned sub-zones, said upper and lower sub-zones having the average angle of inclination increasing from the center of the lens toward the outer periphery thereof and the sub-zones in said lower zone having a curved contour in a radial section through said lens.

14. A headlamp comprising a reflector, a double filament incandescent lamp having one filament above the focal point of said reflector and a lens having a plurality of parallel flutes arranged on one side thereof to spread the light laterally and a plurality of transversely extending prismatic refracting zones on the opposite side thereof to deflect the light downwardly, said refracting zones comprising a central main zone bounded by oppositely curved transverse arcs and an upper zone and a lower zone on opposite sides of said main zone, said upper zone being sub-divided into a series of sub-zones of substantial width, each bounded by substantially concentric arcs and the lower zone being sub-divided into a series of sub-zones bounded by a series of concentric arcs, said upper and lower sub-zones having the average angle of inclination increasing from the center of the lens toward the outer periphery thereof.

ARNOLD N. TAYLOR.